United States Patent [19]

Besl et al.

[11] Patent Number: 5,715,166
[45] Date of Patent: Feb. 3, 1998

[54] APPARATUS FOR THE REGISTRATION OF THREE-DIMENSIONAL SHAPES

[75] Inventors: Paul Joseph Besl, Farmington Hills; Neil David Mc Kay, Royal Oak, both of Mich.

[73] Assignee: General Motors Corporation, Detroit, Mich.

[21] Appl. No.: 844,062

[22] Filed: Mar. 2, 1992

[51] Int. Cl.⁶ .................................................. G01D 1/16
[52] U.S. Cl. ............................. 364/474.24; 382/199
[58] Field of Search ........................... 382/8, 41, 199, 382/201, 203, 204, 206; 364/474.37, 474.28, 474.29, 150, 552, 474.24, 474.03, 474.05

[56] References Cited

U.S. PATENT DOCUMENTS

| | | | |
|---|---|---|---|
| 3,983,376 | 9/1976 | Pozzetti | 364/552 |
| 4,679,331 | 7/1987 | Kooutz | 364/474.37 |
| 4,702,652 | 10/1987 | Rokksku et al. | 364/474.03 |
| 4,979,224 | 12/1990 | Malocco et al. | 364/474.37 |
| 4,995,087 | 2/1991 | Rathi et al. | 364/474.37 |
| 5,016,199 | 5/1991 | McMurtry et al. | 364/474.03 |
| 5,019,993 | 5/1991 | Montalcini et al. | 364/474.03 |
| 5,023,800 | 6/1991 | Caruer et al. | 364/474.24 |
| 5,067,086 | 11/1991 | Yamazaki et al. | 364/474.03 |
| 5,095,439 | 3/1992 | Seki et al. | 364/474.24 |
| 5,115,400 | 5/1992 | Watanabe et al. | 364/474.24 |
| 5,117,169 | 5/1992 | Kakino et al. | 364/474.03 |
| 5,155,558 | 10/1992 | Tanuenbaum et al. | 382/8 |

OTHER PUBLICATIONS

Least–Squares Fitting of Two 3–D Point Sets; K.S. Arun, T.S. Huang, & S.D. Blostein, IEEE Transactions on Pattern Analysis and Machine Intelligence, vol. PAM1–9. No. 5, Sep., 1987.

Three Dimensional Object Representation Revisited; Ruzena Bajcsy & Franc Solina, Grasp Laboratory, Department of Computer & Information Sciences, University of Pennsylvania, Philadelphia, PA 19104–6389, USA 1987 (no month).

Geometric Modeling and Computer Vision; Paul J. Besl, Computer Science Dept., Research Publication–GMR 6248, GM Research Laboratories, Apr. 21, 1988.

The Free–Form Surface Matching Problem; Paul J. Besl, Computer Science Dept., Research Publication–GMR 7045, GM Research Laboratories, May 30, 1990.

3DPO: A Three–Dimensional Part Orientation System; Robert C. Bolles & Patrice Horaud, The International Journal of Robotics Research, vol. 5, No. 3; Fall, 1986 (no month).

Model–Based Recognition in Robot Vision; Roland T. Chin & Charles R. Dyer, Computing Surveys, vol. 18, No. 1; Mar., 1986.

(List continued on next page.)

Primary Examiner—Emanuel T. Voeltz
Assistant Examiner—Thomas Peeso
Attorney, Agent, or Firm—Anthony Luke Simon

[57] ABSTRACT

An apparatus for identifying surfaces, comprising a point digitizing apparatus for obtaining data points of a surface to be located and an apparatus, such as a memory device, for storing a mathematical model of a model surface. A microprocessor control unit registers the mathematical model and the obtained data points, wherein the microprocessor control unit accomplishes the registration by (i) determining a data point set comprising various points from the obtained data points, (ii) finding a set of closest points comprising, for each point of the data point set, a closest point on the first mathematical model, (iii) registering the data point set to the set of closest points to obtain a registered point set, (iv) computing a mean square distance of points of the registered point set to the closest point set, (v) comparing the mean square distance to a predetermined threshold and (vi) if the mean square distance is above a threshold, (vi.i) redefining the data point set as the registered point set and (vi.ii) repeating parts (ii), (iii), (iv) and (v). Resultant from the registration, the control unit provides an output signal that can be used to indicate the surface position, quality and/or identification.

10 Claims, 7 Drawing Sheets

OTHER PUBLICATIONS

The Representation, Recognition, and Locating of 3-D Objects; O. D. Faugeras & M. Herbert, The International Journal of Robotics Research, vol. 5, No. 3; Fall, 1986 (no month).

Estimating Motion From Sparce Range Data Without Correspondence; Richard Szeliski, Schlumberger Palo Alto Research, 3340 Hillview Ave., Palo Alto, CA 94304 1988 (no month).

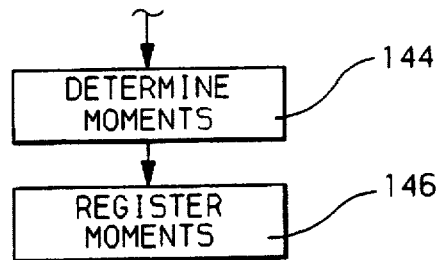
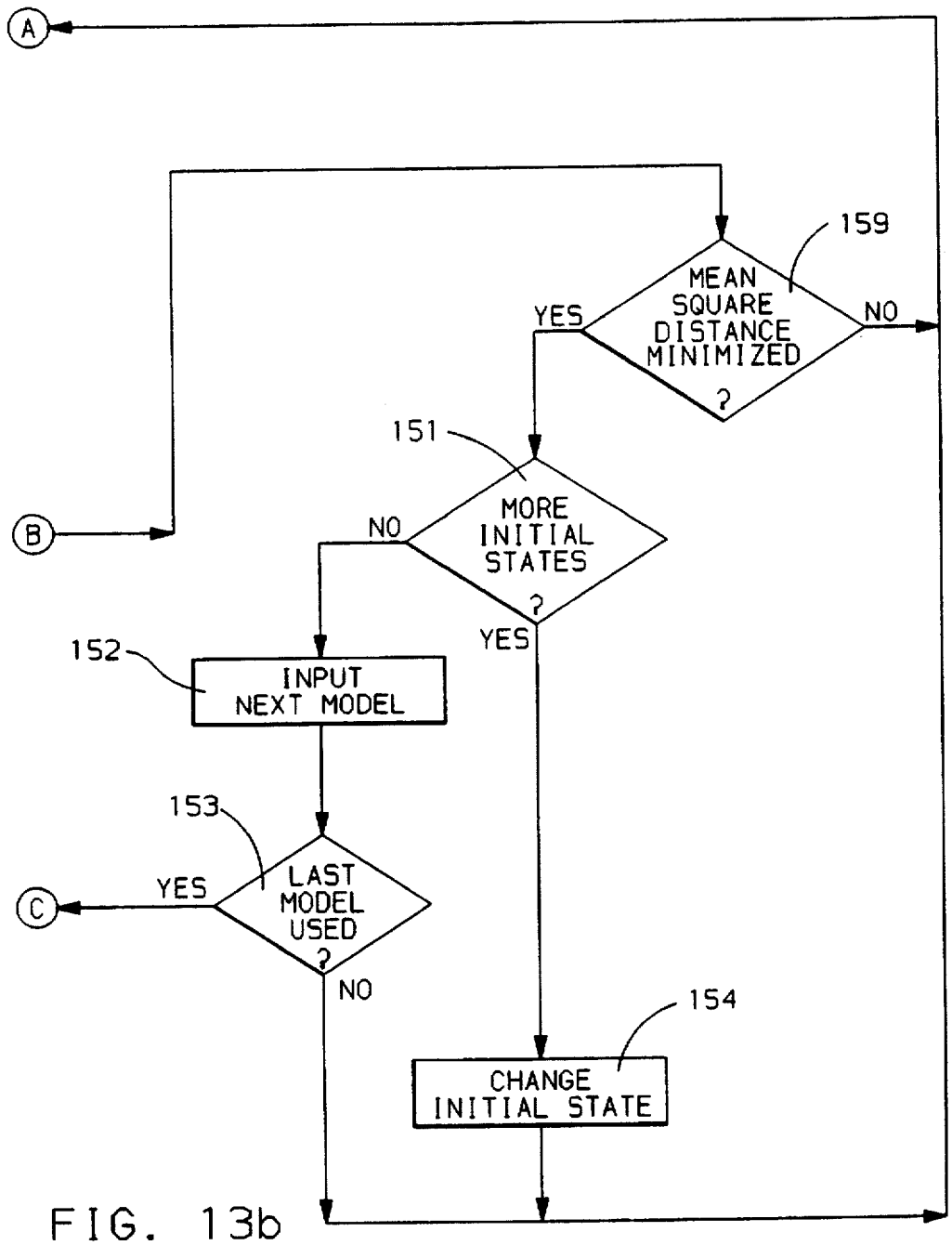

APPARATUS FOR THE REGISTRATION OF THREE-DIMENSIONAL SHAPES

This invention pertains to surface inspection and identification and more particularly to an apparatus for registering three dimensional shapes.

BACKGROUND OF THE INVENTION

Typically, in part fabrication where an irregular controlled surface is desired, the controlled surface is checked for accuracy with a probe connected to a robotic positioning device. The probe is placed on the controlled surface at various points and the positioning device provides positioning information of those various points. By checking numerous points along the controlled surface, data is taken which enables verification of the surface with respect to design specifications.

To ensure that the controlled surface is properly oriented so that the data taken corresponds to a desired reference, the part with the controlled surface is mounted in a fixture device that positions the part with respect to a predetermined reference. Fixtures used in these processes are very expensive in that they require a high degree of precision on various mounting surfaces, especially if sheet metal or other semi-rigid parts are being inspected.

Probe inspection is very time consuming and expensive and is often limited to as little as six points probed per minute. For surfaces in which thousands of points must be taken for surface verification, the inspection can consume hundreds of hours.

What is desired is an apparatus that enables efficient, timely, and less costly inspection of surfaces.

SUMMARY OF THIS INVENTION

This invention provides a shape registration apparatus designed to computationally match three-dimensional surface models of complex surface shapes. A surface description of a physical part is entered using data points from a device such as a ranging imaging sensor. The apparatus of this invention enables simplified surface inspection of the physical part using the data points representing the part, regardless of the orientational direction or position of the part. This enables the elimination of costly part-locating fixtures.

This invention accomplishes the surface inspection by registering the physical part's surface description obtained from the data points with an ideal mathematical model of the part. The ideal mathematical model may be obtained by any means, such as data input from a master of the part, or a data file from a CAD design. Once the part's surface description is registered with the mathematical model, the surface inspection may be quantized as the error between the part's surface description and the mathematical model.

The apparatus of this invention, which accomplishes the registration with a full six degrees of freedom, is based on an Iterative Closest Point (ICP) computational technique. The apparatus estimates the optimal rotation and translation that aligns, or registers, the model shape and the data shape, minimizing the distance between the shapes and thereby determining the equivalence of the shapes. This invention performs the registration with accuracy and computational efficiency and can register point sets, polylines, parametric curves, implicit curves, triangulated surfaces, parametric surfaces and implicit surfaces.

Structurally, the apparatus of this invention comprises means for receiving a mathematical model of a model surface, means for receiving data of a surface to be inspected and a microprocessor control unit for registering the mathematical model and the received data. The microprocessor control unit achieves the registration of the mathematical model and the received data by (i) determining a data point set comprising various points from the obtained data points, (ii) finding a set of closest points comprising, for each point of the data point set, a closest point on the first mathematical model, (iii) registering the data point set to the set of closest points to obtain a registered point set, (iv) computing a mean square distance of points of the registered point set to the closest point set, (v) comparing the mean square distance to a predetermined threshold and (vi) if the mean square distance is above a threshold, (vi.i) redefining the data point set as the registered point set and (vi.ii) repeating parts (ii), (iii), (iv) and (v). Means is provided for outputting an output set comprising at least one of the following (a) a resulting rotation matrix, (b) a resulting translation vector, and (c) the mean square distance.

A more detailed description of this invention along with various other implementations are set forth below.

BRIEF DESCRIPTION OF THE DRAWINGS

FIGS. 13a, 13b and 13c comprise a computer flow diagram for the implementation of the invention shown in FIG. 12.

DETAILED DESCRIPTION OF THE INVENTION

Figure 1:
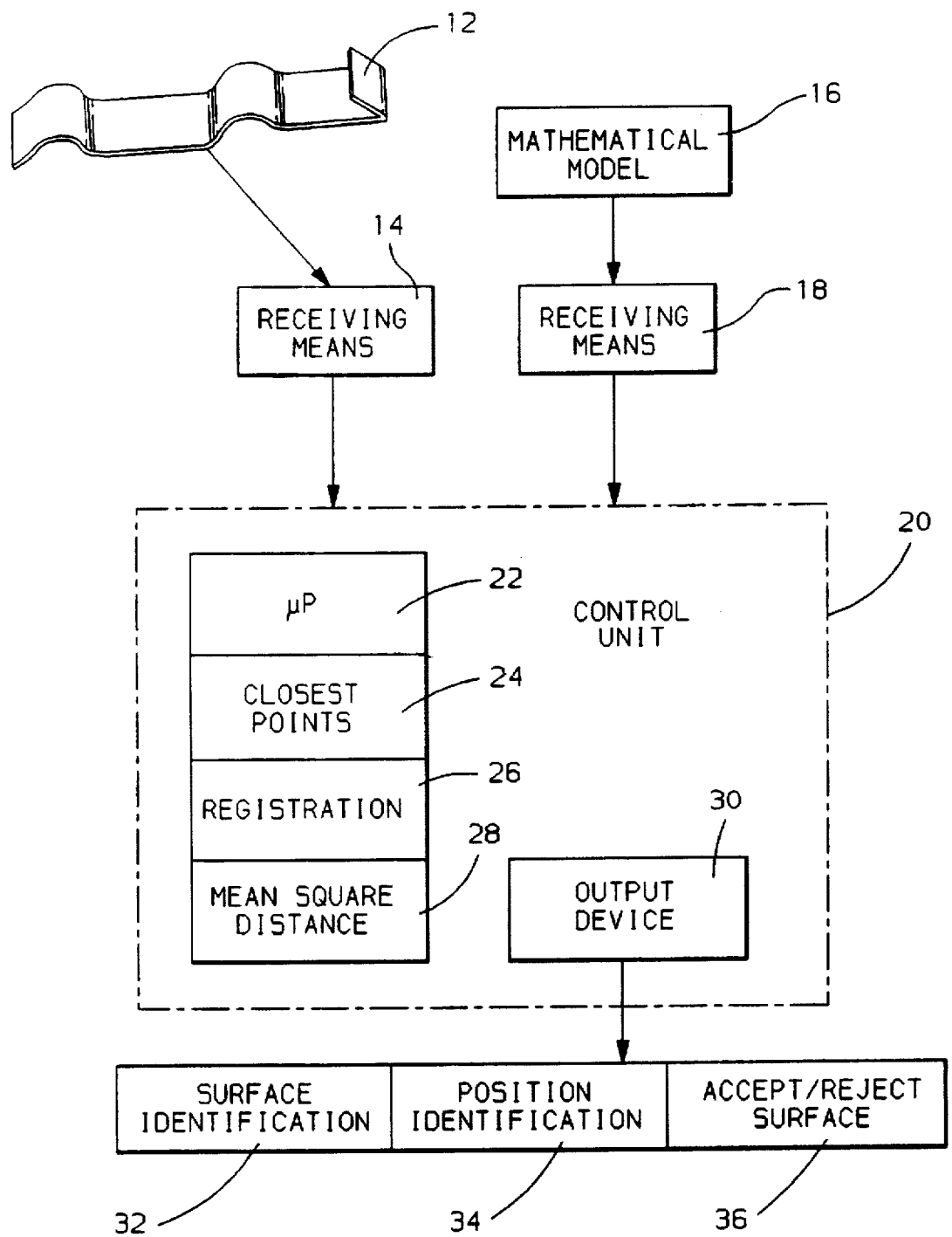
FIG. 1 is a schematic diagram of the invention.

Referring to FIG. 1, a three dimensional surface 12, such as a stamped sheet metal part, is sampled by receiving means 14. Receiving means 14 provides to control unit 20 data representing three dimensional positioning of a set of data points on surface 12. Receiving means 14 may be any form of three-dimension data point receiving/digitizing apparatus, such as a robotic positioning arm probe, a camera range finder, or a laser probe. All of these mentioned means are capable of providing x, y, and z position information for different data points on surface 12 and are readily available to those skilled in the art.

A mathematical model of the surface 12, which may be a CAD file of an ideal three dimensional representation of surface 12, is received by receiving means 18, and provided to the control unit 20.

Control unit 20 includes microprocessor 22 which comprises means 24 for determining the closest points on the mathematical model to the data points, means 26 for registering the data points to the closest points, and means 28 for determining the mean square distance from the registered data points to the mathematical model.

Output device 30 provides information output from the control unit 20 that may be used by means 32 for identifying the surface 12, and selecting the surface if the proper identification is made. The output information may also be used by means 34 for identifying the position of the surface 12 relative to a known control position and may be used by means 36 for accepting or rejecting part 12 as conforming or non-conforming to standards.

Figure 2:
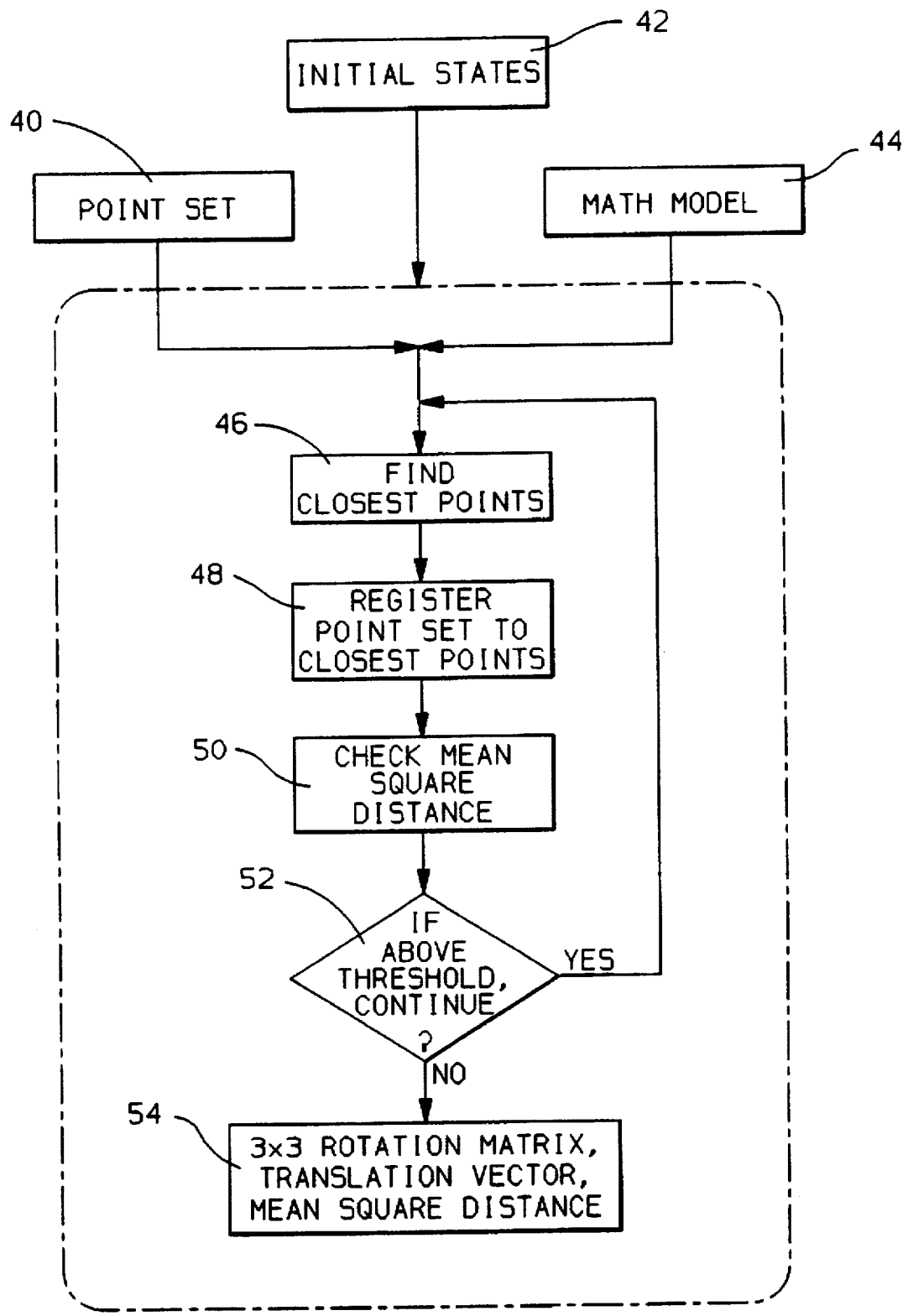
FIG. 2 is a flow chart of the operation of the invention.

Further understanding of the operation of this invention may be achieved with reference to FIG. 2. Referring to FIG.

2, point set 40 represents a set of x, y, z coordinate data points of surface 12 provided by receiving means 14. Mathematical model 44 represents data, such as triangular facet surface data, converted from a CAD model and is given an arbitrary reference in x,y,z coordinates.

At step 46, for each point $(x_i, y_i, z_i)$ in point set 40, the closest point $(x_m, y_m, z_m)$ in the math model 44 is determined. The distance between a point on the model and a point in point set 40 is the square root of $((x_m-x_i)^2+(y_m-y_i)^2+(z_m-z_i)^2)$. The closest point found at step 46 comprises the model points $(x_m, y_m, z_m)$ that provide the minimum distance for each point $(x_i, y_i, z_i)$ in point set 40.

If the mathematical model 44 is given in terms of composite spline surfaces, as is often the case for models from CAD systems, then Newton's method for the closest point on a parametric surface may be used if a sufficiently good starting point is known. Newton's method is readily known to those skilled in the art and a summary of a method to compute a good starting point from an approximate triangulation of the surface is set forth below. This method can also be used directly whenever surface models are provided in a faceted triangle form.

For each triangle, $t_i$, of the mathematical model, it is assumed that there exists an estimated maximum distance, $d_{max}$, to each point in the point set. The estimated maximum distance may be determined a variety of ways, and may depend upon the type of system used. For example, if a camera range finder is used as the receiving means 14, and the mathematical model is arbitrarily referenced to 0,0,0, the estimated maximum distance $d_{max}$ may be set as the maximum distance from 0,0,0 of a data point likely to be digitized by the camera range finder.

For each triangle, $t_i$, of the mathematical model, represented by vectors (i,j,k) and vertexes $(r_1,r_2,r_3)$, six min-max numbers are determined:

$$x_{min}=\min(x_i,x_j,x_k)-d_{max};\quad(1)$$

$$x_{max}=\min(x_i,x_j,x_k)+d_{max};\quad(2)$$

$$y_{min}=\min(x_i,x_j,x_k)-d_{max};\quad(3)$$

$$y_{max}=\min(x_i,x_j,x_k)+d_{max};\quad(4)$$

$$z_{min}=\min(z_i,z_j,z_k)-d_{max};\text{ and}\quad(5)$$

$$z_{max}=\max(z_i,z_j,z_k)+d_{max}.\quad(6)$$

If a point does not fall within the min-max box, then its distance to that triangle is not calculated.

If a point, p, of the point set passes the min-max test, its distance to the triangle, $t_i$, is computed. First, point p is projected into the plane of the triangle to get a point p', defined by:

$$p'=[I-nn^t](p-r_1),\quad(7)$$

where $r_1$ is the triangle vertex with the interior angle closest to 90 degrees and where n is the vector normal to the triangle, $t_i$, computed by taking the normalized cross product of the triangle edge vectors.

Next the barycentric coordinates of p' relative to the triangle are computed, the u vector is defined by $r_2-r_1$ and the v vector is defined by $r_3-r_1$. The barycentric coordinates (u',v') of p' may be determined by solving the following 2×2 system:

$$\begin{vmatrix} u \cdot u & u \cdot v \\ u \cdot v & v \cdot v \end{vmatrix} \begin{vmatrix} u' \\ v' \end{vmatrix} = \begin{vmatrix} u \cdot p' \\ v \cdot p' \end{vmatrix}.\quad(8)$$

Let w'=1−(u'+v'). The In-Triangle condition occurs when 0<u'<1, 0<v'<1 and 0<w'<1. The On-Triangle condition is satisfied if (u'=0, $0\leq v'\leq 1$ and $0\leq w'\leq 1$), or ($0\leq u'1$, v'=0 and $0\leq w'\leq 1$) or ($0\leq u'\leq 1$, $0\leq v'1$ and $w'\leq 0$). The Out-Triangle condition occurs if neither the In nor the On conditions occur. In the In or On case, the point to triangle distance is given by $d=|n\cdot(p-r_1)|$.

If a point does not project to the interior of a triangle, it is closest to one of the edges or vertices of the triangle. For each triangle edge, point to line segment distance calculations are performed. The closest point, its distance, and its barycentric coordinates are the result.

To compute the distance of point p to a line segment, points $p_1$ and $p_2$ of the line segment are used in the following computations:

$$\Delta p_1 = p-p_1\quad(9)$$

$$\Delta p_2 = p_2-p_1\quad(10)$$

$$t=(\Delta p_1 \Delta p_2)/(\Delta p_2 \Delta p_2)\quad(11)$$

and, if $0\leq t\leq 1$, then:

$$d=\|\Delta p_1 \times \Delta p_2\|/\|\Delta p_2\|.\quad(12)$$

if t<0, then $d=\|p-p_1\|$ and if t>1, $d=\|p-p_2\|$. The t value is used to compute the barycentric coordinates of the closest point u,v,w, e.g., if p is closest to the $r_2,r_1$ edge, then u=1−t, v=t, and w =0.

The minimum closest point distance d for all the triangles of the triangulated surface is the closest point distance to a given point $p_i$ in the point set. For each point $p_i$ in the point set 40, the point in the model with the minimum closest point distance d is added to the closest point set at step 46.

At step 48, the point set 40 is registered to the set of closest points found at step 46. A quaternion-based approach is preferred for the registration.

The unit rotation quaternion is a four-vector:

$$q_{R_2}=[q_0,q_1,q_2,q_3]^t\quad(13)$$

where $q_0\geq 0$ and $q_0+q_1+q_2+q_3=1$. The 3×3 rotation matrix generated by a unit rotation quaternion is $$R(q_R) = \begin{bmatrix} q_0^2+q_1^2-q_2^2-q_3^2 & 2(q_1q_2-q_0q_3) & 2(q_1q_3+q_0q_2) \\ 2(q_1q_2+q_0q_3) & q_0^2+q_2^2-q_1^2-q_3^2 & 2(q_2q_3-q_0q_1) \\ 2(q_1q_3-q_0q_2) & 2(q_2q_3+q_0q_1) & q_0^2+q_3^2-q_1^2-q_2^2 \end{bmatrix}\quad(14)$$

If a translation vector $q_T$ is defined as $q_T=[q_4\ q_5\ q_6]^t$, the complete registration state vector $q_k$ is denoted:

$$g_K=[q_R,q_T]^t.\quad(15)$$

Point set 40 is represented by P={$p_i$}. The set of closest points found at step 46 is represented by X={$x_i$}. Each point set P, X has the same number of points and each point $P_1$ has a corresponding point $x_i$.

The center of mass $u_p$, for point set P is given by:

$$u_p = (1/N_p) \sum_{i=1}^{N_p} p_i. \quad (16)$$

The center of mass, $u_x$ for point set X is given by:

$$u_x = (1/N_x) \sum_{i=1}^{N_x} x_i. \quad (17)$$

The cross-covariance matrix $\Sigma_{px}$ of the sets X and P is defined:

$$\Sigma_{px} = (1/N_p)\Sigma[(p_i - u_p)^t] = (1/N_p)\Sigma[p_i x_i^t] - u_p u_x^t. \quad (18)$$

The cyclic components of an anti-symmetric matrix $A_{ij} = (\Sigma_{px} - \Sigma_{px}^T)_{ij}$ are used to form the column vector $\Delta = [A_{1,2} A_{3,1} A_{2,3}]^T$. The symmetric 4×4 matrix, $Q(\Sigma_{px})$, is then formed as follows:

$$Q(\Sigma_{px}) = \begin{bmatrix} tr(\Sigma_{px}) & \Delta^T \\ \Delta & \Sigma_{px} + \Sigma_{px}^T - tr(\Sigma_{px})I_3 \end{bmatrix}, \quad (19)$$

where $I_3$ is the 3×3 identity matrix.

The unit eigenvector $q_R = [q_0 \ q_1 \ q_2 \ q_3]^t$ corresponding to the maximum eigenvalue of the matrix $Q(\Sigma_{px})$ is selected as the optimal rotation. The optimal translation vector is determined by:

$$q_T = u_x - R(q_r)u_p. \quad (20)$$

The registration is accomplished by multiplying the point set P by the rotation vector, $q_R$, and adding the optimal translation vector, $q_T$. The registered point set may be denoted as q(P) and, during the iteration of the registration process, $P_{k+1} = q(P_k)$.

At step 50, the mean square distance, $d_{ms}$, (the mean square point matching error) is determined according to the least squares quaternion operation and is denoted as:

$$(q, d_{ms}) = Q(P, X). \quad (21)$$

At step 52, the mean square distance, $d_{ms}$, is compared to a threshold, set by a system designer corresponding to the system requirements. The mean square distance can be used as a position error determination, and if the mean square distance is above the threshold, the registration is considered not complete. The registration process is then reiterated starting from step 46 using $P_{k+1}$ determined in the last iteration as the new point set.

After each iteration, the resulting rotation and translation vectors are stored. When accurate registration is achieved, the position of surface 12 is known by concatenating the rotation and translation vectors leading from the initial state to the registration with the rotation and translation vectors between the input point set and the initial state from which registration is achieved (the initial states are described below). The resulting position of surface 12 is with respect to the arbitrary coordinates of the control unit, but may be easily calibrated to a given reference for any specific implementation.

After several iterations, if the mean square distance has minimized, but is still not below the threshold, the process is repeated with the point set 40 in a new initial state from block 42. For example, with the original initial state of the point set (six dimensional orientation), the registration process may progress to a non-desirable registration. This may occur if the surface being registered and the model surface can be registered in improper orientation with a minimizing mean square distance. When the error minimizes, but does not fall below the threshold, the explanation may be an improper orientation of the surface to the model.

To address this situation, the initial state of the point set is altered to an orientation different from the initial orientation that led to the non-desirable registration. The registration process is then repeated with the reoriented point set. If the error minimizes in an improper orientation again, the initial state is again changed and the process is repeated until the error falls within the threshold. For automotive parts, such as sheet metal, it has been found that four initial states are typically sufficient for exact registration. The four initial states are (i) the original state of the point set, (ii) 180 degree rotation about the x axis, (iii) 180 degree rotation about the y axis and (iv) 180 degree rotation about the z axis. In surfaces where the registration may minimize to many possible improper orientations, additional initial states may be necessary, and may be set by the system designer with respect to the types of surfaces being registered.

If all of the initial states are applied and the mean square distance has not been minimized under the threshold, the conclusion may be reached that the surface cannot be registered to the model. This test may be used in object-identification implementations, explained in more detail below.

When registration is completed to a point in which the mean square distance, $d_{ms}$, is below the threshold, the next step is to output the data useful for processing the surface. This data may include the rotation matrix, translation vector, and mean square distance, $d_{ms}$.

The rotation matrix and translation vector can be used to determine the precise location of the surface. This information is useful in manufacturing processes involving non-fixtured surfaces. For example a randomly located surface may enter a step in a manufacturing process where a hole in the part needs to be precisely drilled. The rotation matrix and translation vector can be output to the computer controller for a robotic drill, which can use the position information to precisely drill the hole in the part in the proper location. In summary, the position information can be used to locate the part for any type of necessary processing.

The mean square distance information can be used to determine surface quality. A larger mean square distance indicates a higher degree of surface nonconformity. In addition, a closest point set may be determined in a manner similar to step 46 and sorted by the magnitudes of the minimum closest point distances, d, to determine areas of surface imperfection. This can be extremely useful for inspecting sheet metal and plastic panel parts. In an inspection process, if the mean square distance is too high, or surface imperfections are found, the part can be rejected.

Figure 3:
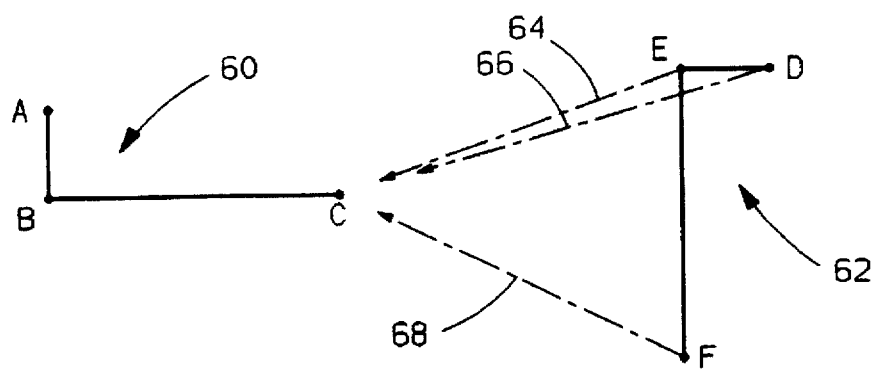
FIGS. 3–11 illustrate how this invention registers multi-dimensional shapes.
Figure 4:
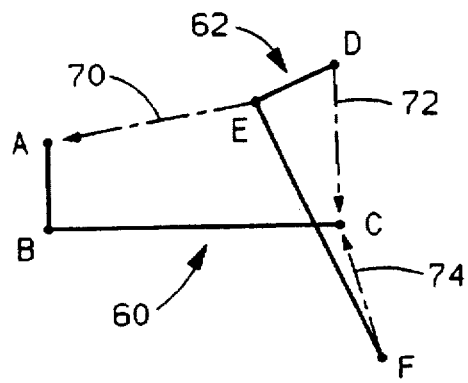
Figure 5:
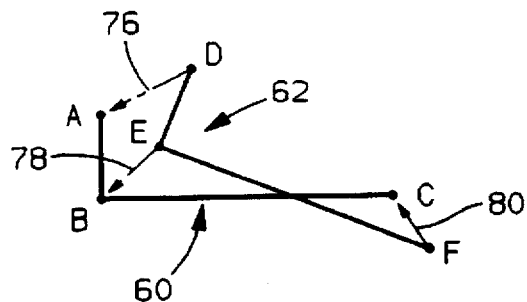

Referring to FIGS. 3–6, an illustration of the process of steps 46–52 (FIG. 2) is shown with a simple example. Shape 60 represents the mathematical model data of the part defined by points A, B and C oriented to an arbitrary position. In FIG. 3, point set (and shape) 62 represents the surface information provided by receiving means 14 (FIG. 1), and is defined by point set D, E and F oriented in the position sensed by receiving means 14.

During step 46 (FIG. 2) of finding the closest points, each of the points D, E and F of point set 62 is matched to the closest points on the model shape 60 in the manner described above. In FIG. 3, representing the first iteration, step 46 matches points D, E and F with point C, .which is closest to points D, E and F, as indicated by arrows 64, 66 and 68. At step 48 during the first iteration, the point set 62 is registered as described above to the closest point set, comprising point C for every point D, E and F, i.e., the closest point set is [C C C]. The result is the orientation of the point set 62 shown in FIG. 4. Since the registration is not very close, the threshold for $d_{ms}$ is not met and step 46 is repeated using the new orientation of the point set 62 shown in FIG. 4.

In the second iteration of step 46, point E is matched with point A, its closest point, and points D and F are matched again to point C as shown by arrows 70, 72 and 74. The second iteration of step 48 is completed by registering point set 62 to the closest point set [C A C]. The result of the registration is the position of point set 62 shown in FIG. 5. Again since the registration is not very close, the threshold for $d_{ms}$ is not met and step 46 is again repeated.

Figure 6:
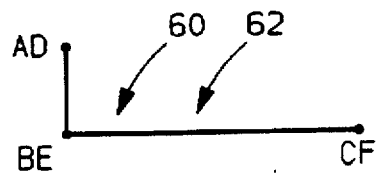

In the third iteration of step 46, point D is matched with point A, point E is matched with point B and point F is matched with point C as shown by arrows 76, 78 and 80. When the point set 62 is registered onto the closest point set [A B C] (step 48), the result is an accurate registration as shown in FIG. 6. The amount of rotation and translation required to move the point set 62 from the position shown in FIG. 3 to the position shown in FIG. 6 is provided with the rotation matrix, $q_R$, and translation vector, $q_T$, output described above. The rotation and translation information also represents the position of the surface with respect to the arbitrary positioning of model data 60.

FIG. 6 is drawn with the points D, E and F exactly matching up with points A, B and C. In actual implementation, there will be some error due to part deviation, part tolerances and measurement tolerances. These errors can be quantified by the mean square distance, $d_{ms}$, computed as described above.

Figure 7:
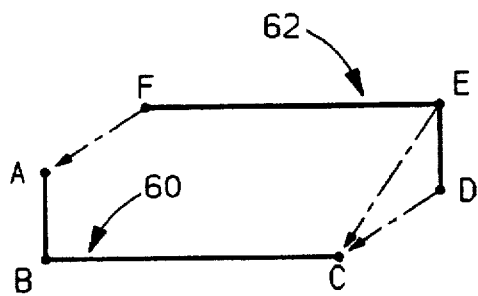
Figure 8:
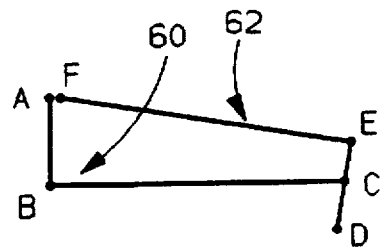

Referring to FIG. 7, a second example is shown with mathematical model 60 and point set 62 for a part with a different initial position. With the registration shown in FIG. 8, it can be seen that the rotation and translation of point set 62 minimizes error in an improper orientation, with point set [D E F] continuously trying to register to closest point set [C C A].

Figure 9:
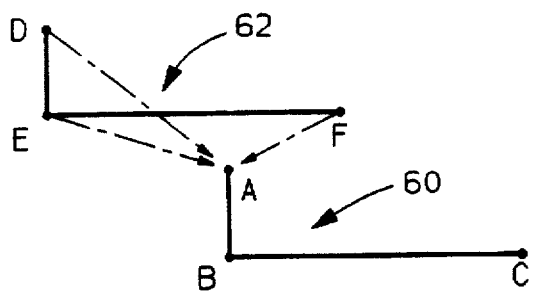
Figure 10:
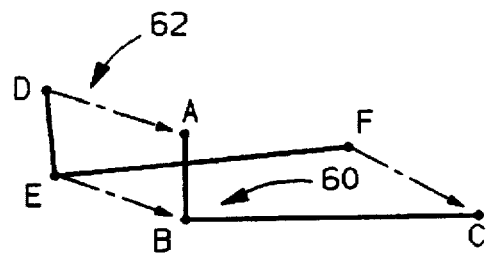
Figure 11:
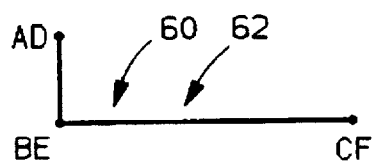

Since the minimum error is reached, and the mean square distance, $d_{ms}$, is too large, a second initial state for point set 62 is used, as shown in FIG. 9. The second initial state shown in FIG. 9 for point set 62 is simply a 180 degree rotation about an axis from the initial state shown in FIG. 7. As FIGS. 10 and 11 show, from the second initial state, proper registration is easily achieved. Note: it may occur that several initial states need to be tried before a proper registration is achieved.

Figure 12:
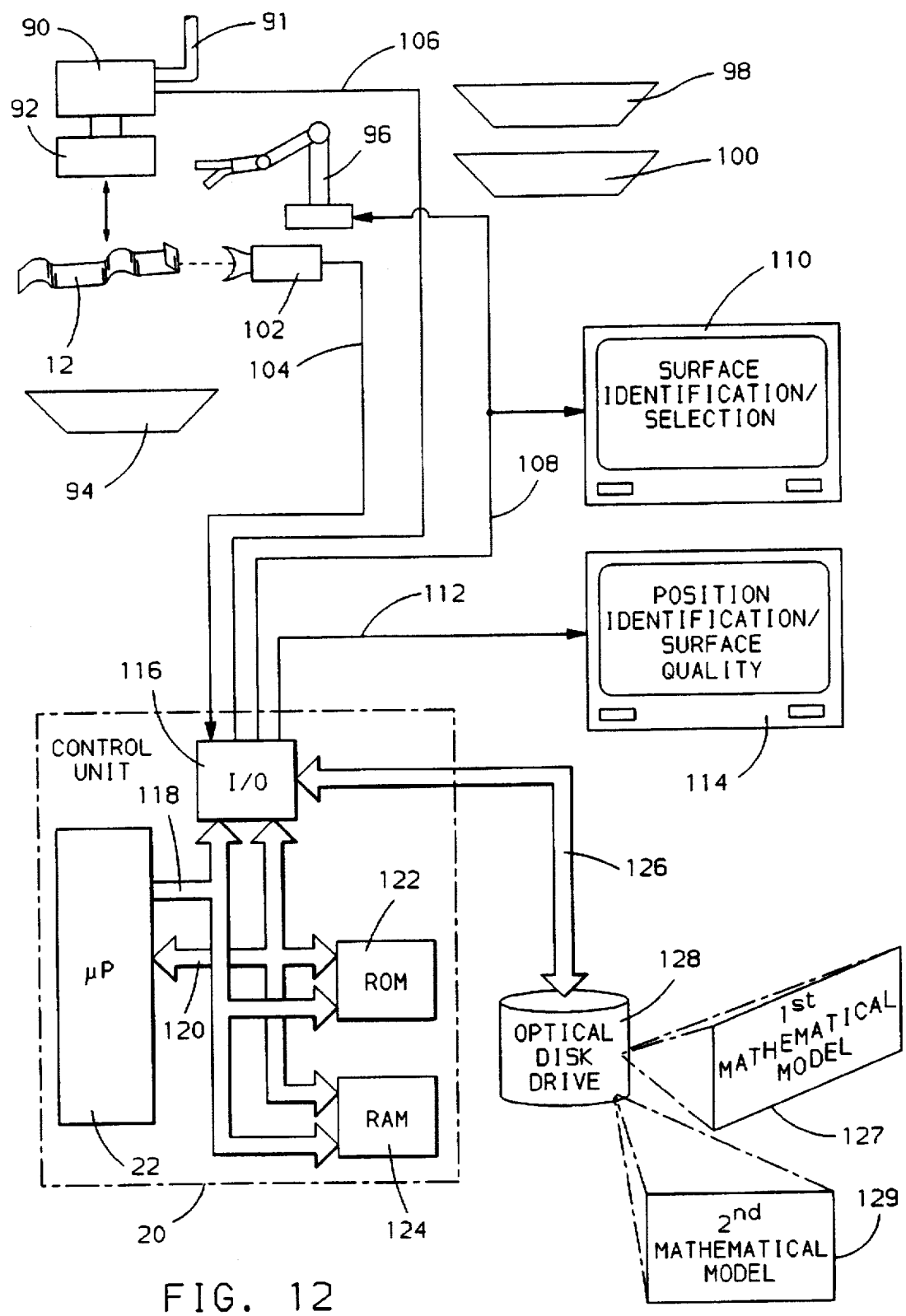
FIG. 12 is a preferred implementation of the apparatus of the invention.

Referring to FIG. 12, the implementation of this invention shown illustrates that this invention has many uses. The part 12 is viewed by range finding camera 102, readily available to those skilled in the art. Camera 102 is the receiving means and provides data on line 104 to the control unit 20 in the form of x,y,z coordinates of a set of points on the surface of part 12.

Control unit 20 is generally one of any type of suitable microprocessor control units and includes microprocessor 22, input/output interface 116, ROM 122 and RAM 124. Microprocessor 22 generally controls the operation of the control unit through command bus 118 and transfers data within the control unit through bi-directional data bus 120.

Control unit 20 receives the data on line 104 through input/output unit 116. The mathematical model data is stored in an optical disc drive 128, and is retrieved via bus 126 and input/output unit 116. The control unit performs the registration as detailed herein using the mathematical model data and the data received from camera 102.

After the registration is completed, the control unit may provide a signal on line 112 used to drive display 114 to indicate the position of part If this invention is implemented in an inspection and control process, the results of the registration can serve as an indication of the quality of part 12, which can be displayed on display 114. If part 12 is of satisfactory quality, it may continue in the manufacturing process. If part 12 is of unsatisfactory quality, a signal is provided in line 106 to control pneumatic cylinder 90, which performs a quality control manufacturing operation. Pneumatic cylinder 90 receives air pressure through pneumatic line 91 and responsively extends the cylinder causing butt 92 to knock rejected part 12 off of the manufacturing line into rejected part container 94.

If this invention is used to identify parts, e.g., choose between one or more parts, two or more mathematical models (127 and 129) are stored in optical disk drive 128. If the data provided by camera 102 cannot be registered to the first mathematical model, the next model is input into control unit 20 and the registration process is repeated until the part is identified (i.e., a successful registration) or the mathematical models are exhausted.

When the part 12 is successfully registered to one of the mathematical models, a successful identification of the part is made, and a signal output on line 108 indicates the identification of the part, which is displayed on display 110. Alternatively, the identification signal can be provided to a part sorter, such as robot 96, which places part 12 in one of two containers 98 or 100 depending on which mathematical model the part 12 is successfully registered.

Figure 13A:
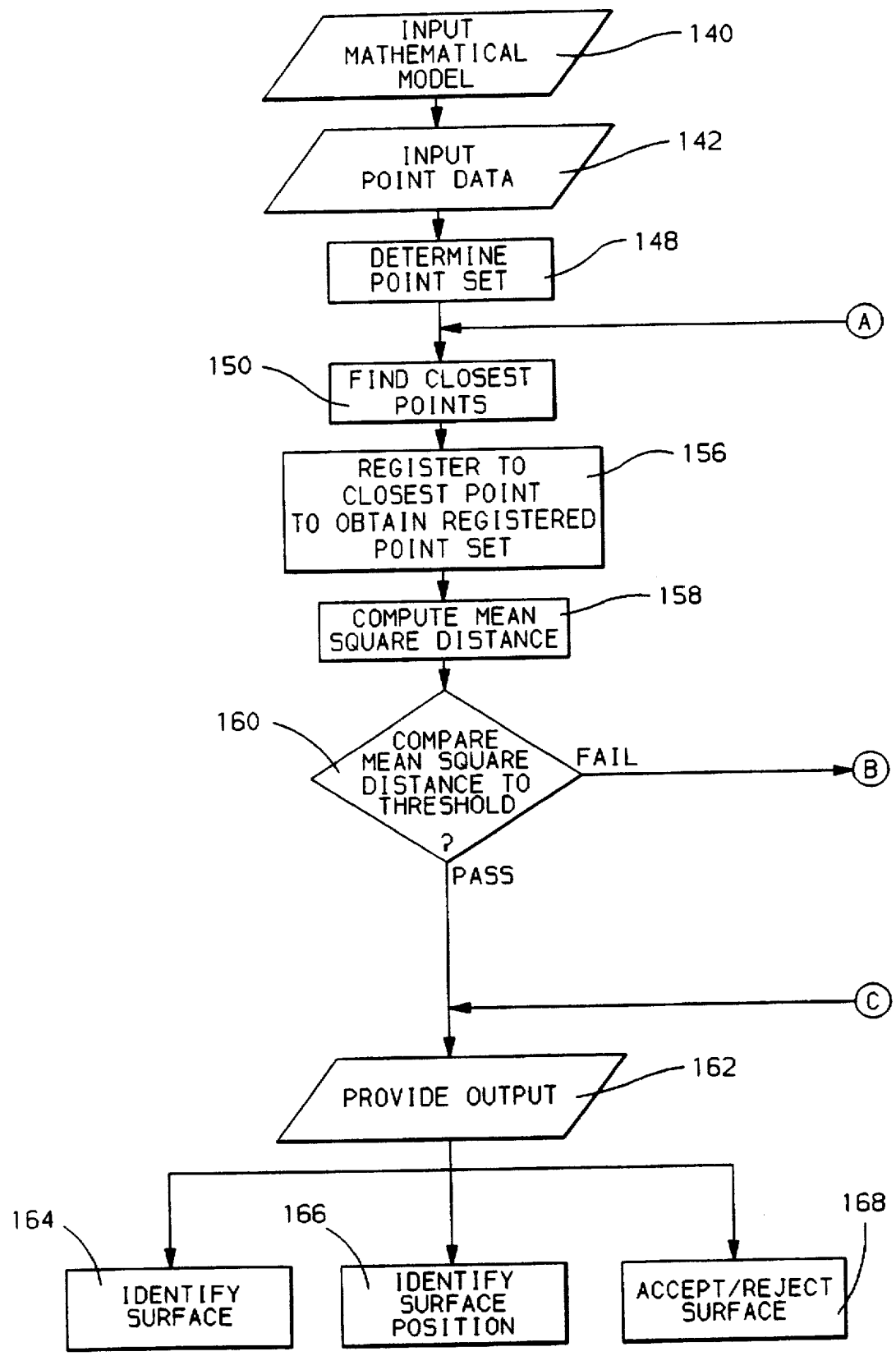

Referring to FIGS. 13a–c, an example computer flow routine that could be used by microprocessor 22 for the implementation shown in FIG. 12 starts at block 140. At block 140, the mathematical model 127 is input to the control unit from optical disk drive 128 and converted, if necessary, to a desirable format. Such conversions are easily accomplished by those skilled in the art.

At step 142, the point data from camera 102 is received by the control unit. At step 148 the point set is determined and may comprise all of the input point data or a sample of the input point data, such as every 100th or every 1000th point.

Steps 144 and 146 (FIG. 13c) are optional but may increase the speed of the registration if implemented between blocks 148 and 150. At step 144, the moments of part 12 and the mathematical model are computed according to equations (16) and (17) above and are registered at step 146. Registering the data set to moments is readily known to those skilled in the art and will not be set forth here in detail. By registering the data set to the moments, a close approximation to the final registration may be accomplished, eliminating several iterations of steps 150, 156 and 158.

The routine then moves to block 150 where the set of closest points is determined as described above with reference to equations (1)–(12). At step 156, the point set is registered to the set of closest points as described above with reference to equations (13)–(20).

At step 158, the mean square distance is computed according to equation (21) above.

At step 160, the mean square distance is compared to a threshold. The threshold may be determined by a summation of the expected surface tolerances, camera range finding tolerances and tolerances caused by noise and sampling error in the system. If, at block 160, the mean square distance is greater than the threshold, then the routine moves to block 159, where it tests to see if the mean square distance is minimized. The test at block 159 may be, for example, to determine if $d_{ms}(k) < 0.95 d_{ms}(k-1)$, and if so to return to block 150 to reiterate steps 150, 156, 158 and 160.

If, at block 159, it is determined that the mean square distance is minimized, the routine continues to block 151, where it determines whether all of the initial states have been tried. If more initial states may be tried, the routine moves to block 154 where it changes the initial state of the point set an continues to block 150.

If all of the initial states have been tried, and a complete registration has not been achieved, the routine may assume that the surface is not registerable to the model and either try another model, input at block 152, or move to block 162. Multiple models are used if the part 12 is to be identified as one of two or more possible parts. If another model is input, the routine continues with the registration at block 150, attempting to register the point set to the new mathematical model. If all of the models have been input and used in attempted registration, then block 153 moves the routine to block 162.

At block 162, the controller outputs command/data information to control a controllable device or display data. At block 164, the part 12 is identified, either by displaying the part identity on a display or by controlling a sorting means such as a robot 96 to sort the part 12. At block 166, the position of part 12 is provided either to a display device or to an apparatus which may use the positioning information to perform an operation on part 12. At block 168, the device is accepted if it is successfully registered to a mathematical model or rejected, i.e., by a command to pneumatic cylinder 90.

In implementation of this invention an acceleration may be added to eliminate some of the registration iterations. The acceleration uses a minor variation on basic line searches of multivariate unconstrained minimization. As the registration iterates, a sequence of registration vectors is generated: $q_1$, $q_2$, $q_3$, $q_4$, ... which traces out a path in the registration state space from the identity transformation toward a locally optimal shape match.

A difference vector $\Delta q_k$ may be defined:

$$\Delta q_k = q_k - q_{k-1},$$

which defines a direction in the registration state space. The seven-space angle $\theta_k$ between the two last directions of q may be denoted as:

$$\theta_k = \cos^{-1}((\Delta q_k{}' \Delta q_{k-1})/(\|\Delta q_k\| \|\Delta q_{k-1}\|)),$$

and a $\delta\theta$ is defined as a small angular tolerance (e.g., 10 degrees).

If $\theta_k < \delta\theta$ and $\theta_{k-1} < \delta\theta$, there is good direction alignment for the last three registration state vectors: $q_k$, $q_{k-1}$ and $q_{k-2}$. Their associated mean square errors are denoted by $d_k$, $d_{k-1}$ and $d_{k-2}$. Associated approximate arc length argument values $v_k$, $v_{k-1}$ and $v_{k-2}$ are defined as $v_k=0$, $v_{k-1}=\|\Delta q_k\|$ and $v_{k-2}=\|\Delta q_{k-1}\|+\|\Delta q_k\|$.

A linear approximation and a parabolic interpolant to the last three data points are computed as:

$$d_1(v) = a_1 v + b_1 \text{ and } d_2(v) = a_2 v^2 + b_2 v + c_2$$

which give a possible linear update, based on the zero crossing of the line and a possible parabola update, based on the extremum point of the parabola:

$$v_1 = -b_1/a_1 > 0 \text{ and } v_2 = -b2/(2a_2).$$

A maximum allowable $v_{max}$ is adopted, i.e. $v_{max} = 25\|\Delta q_k\|$.

To use the acceleration: (i) if $0 < v_2 < v_1 < v_{max}$ or $0 < v_2 < v_{max} < v_1$, the parabola-based update registration vector:

$$q_k' = q_k + v_2 \Delta q_k / \|\Delta q_k\|$$

is used instead of the usual vector $q_k$ in step 48 (FIG. 2) or step 156 (FIG. 13a); (ii) if $0 < v_1 < v_2 < v_{max}$ or $0 < v_1 < v_{max} < v_2$ or $v_2 < 0$ and $0 < v_1 < v_{max}$, the line-based update registration vector:

$$q_k' = q_k + v_1 \Delta q_k / \|q_k\|$$

is used instead of vector $q_k$; if both $v_1 < v_{max}$ and $v_2 < v_{max}$, the maximum allowable update:

$$q_k' = q_k + v_{max} \Delta q_k / \|q_k\|$$

is used instead of the usual vector $q_k$.

Use of the above acceleration can substantially reduce the number of iterations of steps 46–52 (FIG. 2) and may provide substantial time reduction in achieving the output, i.e., typically 60 to 70 percent of the iterations may be eliminated, although some implementations will save more iterations and some implementations will save fewer.

This invention as illustrated above has several advantages, including a quick response time to an accurate registration for three dimensional surfaces, the ability to accurately register surfaces despite noise in the data point set due to sampling error, measurement error, and surface imperfections. Also note that this invention may register surfaces accurately when the data point set only describes a portion of surface 12. For example if surface 12 is a fairly large sheet metal part, and the mathematical model contains the entire part, the apparatus of this invention can accurately determine the location of surface 12 even if only a relatively small portion of the surface 12 is sampled to obtain the data point set.

The above implementations are example implementations and equivalents for apparatus shown may also be used. For example, camera 102 may be replaced by any means capable of providing data point coordinates on a surface, including robotic positioning probes, laser probes and scanners. The process means such as cylinder 90 and robotic arm 96 for responsively operating on the part 12 may be any appropriate means responsive to the information output of the control unit, including inspection devices and manufacturing process devices. Control unit 20 is considered equivalent to control units with two or more microprocessors. In sum the possible implementations of this invention are endless. Some additional implementations may occur to those skilled in the art and will fall within the scope of this invention as defined below.

The embodiments of the invention in which an exclusive property or privilege is claimed are defined as follows:

1. A surface position locating apparatus comprising:
   means for obtaining data points of a surface of a physical object;
   means for receiving a mathematical model of a model surface, a microprocessor control unit for registering the mathematical model and the obtained data points, wherein the microprocessor control unit comprises, for accomplishing the registration, (i) means for determining a data point set comprising various points from the obtained data points, (ii) means for finding a set of closest points comprising, for each point of the data point set, a closest point on the mathematical model, (iii) means for registering the data point set to the set of closest points to obtain a registered point set, (iv) means for computing a mean square distance of points of the registered point set to the closest point set, (v) means for comparing the mean square distance to a predetermined threshold and (vi.i) means for redefining the data point set as the registered point set if the mean square distance is above a threshold and (vi.ii) means for repeating parts (ii), (iii), (iv) and (v) if the mean square distance is above the threshold; and means for providing an output signal resultant from the registration, the output signal indicative of a position of the surface; and means for displaying the position of the surface responsive to the output signal.

2. A surface inspection apparatus comprising:

means for obtaining data points of a surface of a physical object;

means for receiving a mathematical model of a model surface, a microprocessor control unit for registering the mathematical model and the obtained data points, wherein the microprocessor control unit comprises, for accomplishing the registration, (i) means for determining a data point set comprising various points from the obtained data points, (ii) means for finding a set of closest points comprising, for each point of the data point set, a closest point on the mathematical model, (iii) means for registering the data point set to the set of closest points to obtain a registered point set, (iv) means for computing a mean square distance of points of the registered point set to the closest point set, (v) means for comparing the mean square distance to a predetermined threshold and (vi.i) means for redefining the data point set as the registered point set if the mean square distance is above a threshold and (vi.ii) means for repeating pans (ii), (iii), (iv) and (v) if the mean square distance is above the threshold; and means for providing a first output signal resultant from the registration, the first output signal indicative of surface quality; and means for displaying the surface quality responsive to the first output signal.

3. The apparatus of claim 2, also comprising:

means for providing a second output signal resultant from the registration, the second output signal indicative of surface position; and means for displaying the surface position responsive to the second output signal.

4. A surface inspection apparatus comprising:

means for obtaining data points of a surface of a physical object;

means for receiving a mathematical model of a model surface, a microprocessor control unit for registering the mathematical model and the obtained data points, wherein the microprocessor control unit comprises, for accomplishing the registration, (i) means for determining a data point set comprising various points from the obtained data points, (ii) means for finding a set of closest points comprising, for each point of the data point set, a closest point on the mathematical model, (iii) means for registering the data point set to the set of closest points to obtain a registered point set, (iv) means for computing a mean square distance of points of the registered point set to the closest point set, (v) means for comparing the mean square distance to a predetermined threshold and (vi.i) means for redefining the data point set as the registered point set if the mean square distance is above a threshold and (vi.ii) means for repeating parts (ii), (iii), (iv) and (v) if the mean square distance is above the threshold; and means for providing an output signal resultant from the registration, the output signal indicative of surface quality; and means for performing a function selected from the group consisting of (i) accepting the surface and (ii) rejecting the surface, wherein said selected function is performed responsive to the output signal.

5. An apparatus for identifying surfaces, comprising:

means for obtaining data points of a surface of a physical object;

means for receiving a mathematical model of a model surface, a microprocessor control unit for registering the mathematical model and the obtained data points, wherein the microprocessor control unit comprises, for accomplishing the registration, (i) means for determining a data point set comprising various points from the obtained data points, (ii) means for finding a set of closest points comprising, for each point of the data point set, a closest point on the mathematical model, (iii) means for registering the data point set to the set of closest points to obtain a registered point set, (iv) means for computing a mean square distance of points of the registered point set to the closest point set, (v) means for comparing the mean square distance to a predetermined threshold and (vi.i) means for redefining the data point set as the registered point set if the mean square distance is above a threshold and (vi.ii) means for repeating parts (ii), (iii), (iv) and (v) if the mean square distance is above the threshold; and means for providing an output signal resultant from the registration, the output signal indicative of surface identification; and means for performing at least one of a set of functions comprising: (a) displaying the surface identification responsive to the output signal and (b) sorting the surface responsive to the output signal.

6. An apparatus for identifying surfaces, comprising:

means for obtaining data points of a surface of a physical object;

means for receiving a first mathematical model of a first model surface, a microprocessor control unit for registering the first mathematical model and the obtained data points, wherein the microprocessor control unit comprises, for accomplishing the registration, (i) means for determining a data point set comprising various points from the obtained data points, (ii) means for finding a set of closest points comprising, for each point of the data point set, a closest point on the first mathematical model, (iii) means for registering the data point set to the set of closest points to obtain a registered point set, (iv) means for computing a mean square distance of points of the registered point set to the closest point set, (v) means for comparing the mean square distance to a predetermined threshold and (vi.i) means for redefining the data point set as the registered point set if the mean square distance is above a threshold and (vi.ii) means for repeating parts (ii), (iii), (iv) and (v) if the means square distance is above the threshold; and means for providing an output signal resultant from the registration, the output signal indicative of at least one member of a signal set comprising: (a) surface identification, (b) surface position and (c) surface quality.

7. The apparatus set forth in claim 6, also comprising at least one member of a means set including: (a) means for displaying position of the inspected surface responsive to the output signal, (b) means for identifying the inspected surface responsive to the output signal, (c) means for performing manufacturing operation on the inspected surface responsive to the output signal and (d) means for displaying quality of the inspected surface responsive to the output signal.

8. The apparatus set forth in claim 6, wherein the microprocessor control unit also (i) determines moments of the first mathematical model and the data point set and (ii) registers the moments of the point set to the moments of the first mathematical model.

9. The apparatus set forth in claim 6, wherein the microprocessor control unit also comprises (i) means for determining if the mean square distance is minimizing to a point above the threshold and (ii) means for changing the initial state of the data point set if the determination indicates that the mean square distance is minimizing to a point above the threshold.

10. The apparatus set forth in claim 6 wherein the microprocessor control unit also registers a second mathematical model of a second model surface and the received data, and wherein the apparatus also comprises:

means for receiving the second mathematical model;

means for providing a second output signal resultant from the second registration; and means for performing at least one function of a set of functions comprising: (a) displaying the surface identification responsive to the first and second output signals and (b) sorting the surface responsive to the first and second output signals.

* * * * *